United States Patent

[11] 3,566,751

[72] Inventor Richard H. Sheppard
 101 Philadelphia St., Hanover, Pa. 17331
[21] Appl. No. 852,530
[22] Filed Aug. 12, 1969
[45] Patented Mar. 2, 1971
 Continuation of application Ser. No.
 690,964, Dec. 15, 1967, now abandoned.

[54] POWER STEERING GEAR
 8 Claims, 4 Drawing Figs.
[52] U.S. Cl. .................................................. 92/136,
 74/498
[51] Int. Cl. ...................................................... F01b 9/04
[50] Field of Search .......................................... 74/498,
 499, 500, 422, 388 (P.S.); 92/136, 138; 91/380,
 375; 151/(Inquired); 251/(Inquired)

[56] References Cited
 UNITED STATES PATENTS
 2,936,739  5/1960  Levensteins et al. .......... 92/136X 3,092,083  6/1963  Sheppard ..................... 92/136X
3,419,247  12/1968  Bosi ............................. 251/214

*Primary Examiner*—Milton Kaufman
*Attorney*—Lowe and King

ABSTRACT: A power steering apparatus wherein an offset piston is slidable within a stepped cylinder to provide a more compact design. The piston is in slidable engagement with the cylinder on both sides of the driving rack whereby the return chamber enclosing the driven pinion and said rack is subject only to return pressure. The operating end of the body of said piston is cut back opposite said pinion for further compactness and said pinion is provided with alternate sets of teeth and reduced lands for cooperation with said rack and the sealing area of said piston, respectively. The body of said piston is made separate from the enlarged disc and detachably mounted thereon.

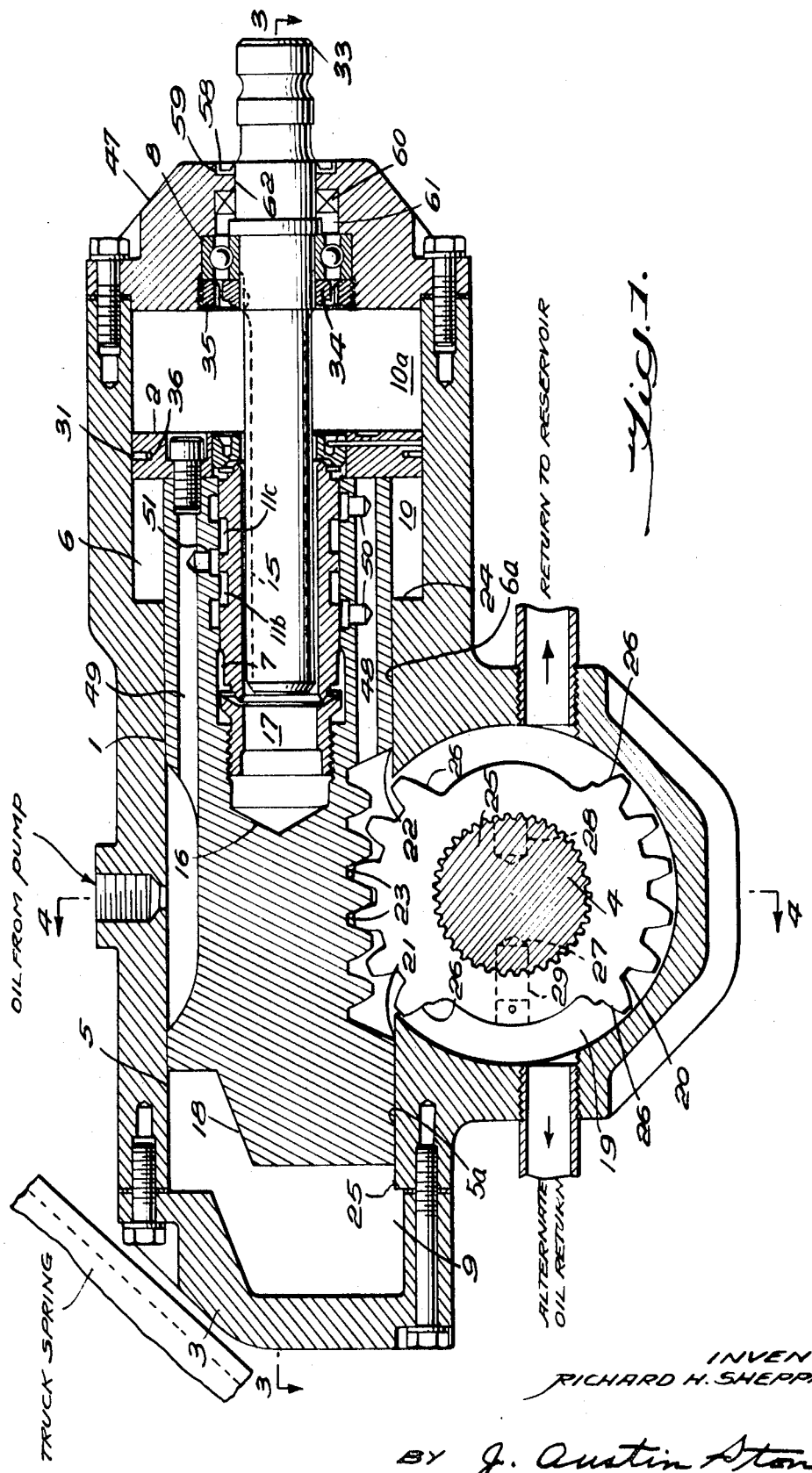

Patented March 2, 1971
3,566,751
3 Sheets-Sheet 2
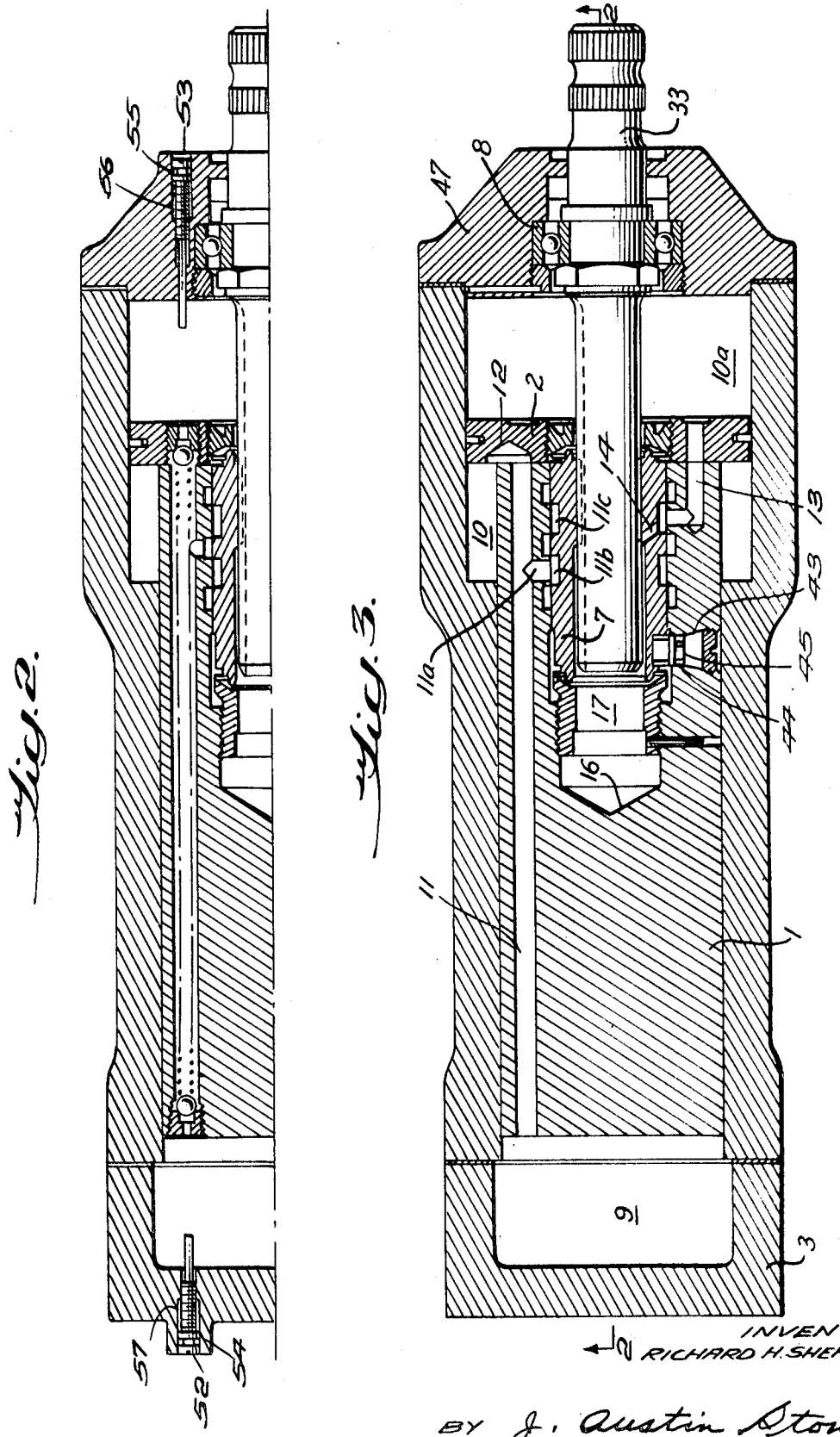

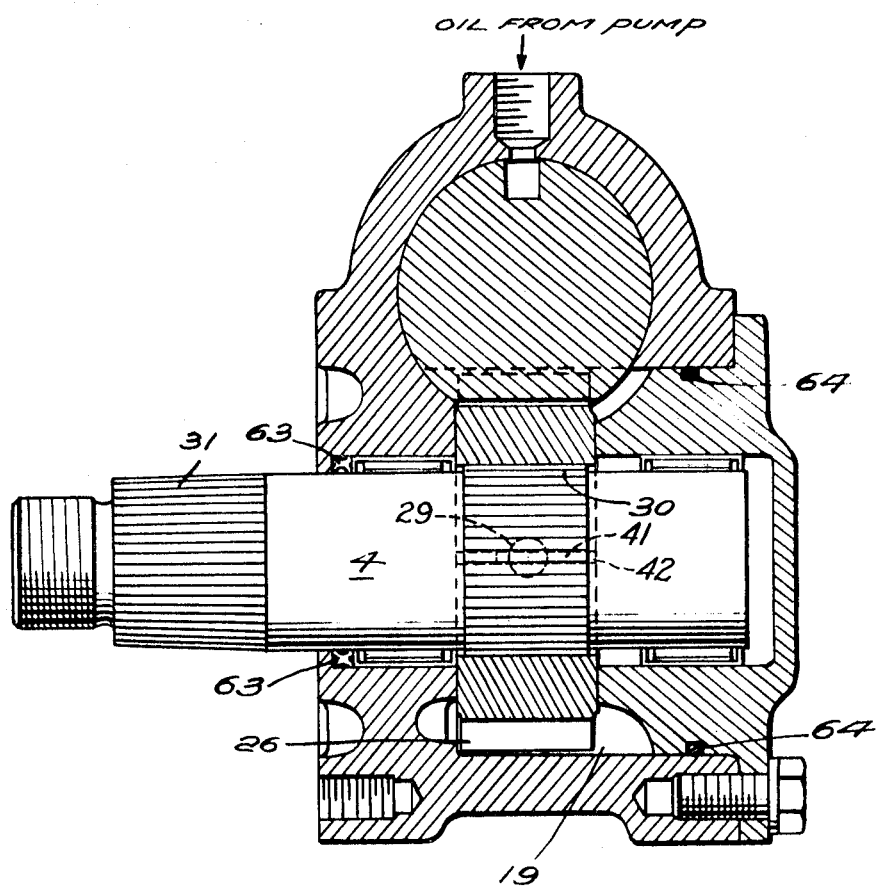

POWER STEERING GEAR

This application is a continuation of U.S. Pat. No. 690,964 entitled "Power Steering Gear" filed Dec. 15, 1967, now abandoned.

The present invention relates to power steering for motor vehicles, and more particularly, to an improved steering gear design.

One of the major design problems for power steering apparatus is concerned with the need for increased compactness to allow for conservation of space within the confines of the frame and springs of the vehicle. With the advent of additional assist units on the engine of a vehicle, such as power steering apparatus, power brakes, air-conditioning compressor and the like, a saving of a few inches in any of these can be quite important, not only from the viewpoint of having adequate space for all of the power assist units desired but to provide ample room for servicing of the units themselves and the engine. The construction of the steering gear for power steering as disclosed in the present application does provide for a saving of space in a unique way.

To briefly summarize some of the important aspects of the present invention, the cylinder of the power steering gear is formed in a stepped fashion with the operating piston being of an offset design having an elongated body in the smaller cylinder portion and an enlarged disc in the larger cylinder portion. The driven output pinion engages a rack on the body of said piston with sealing areas being located immediately adjacent the ends of said rack. By this arrangement, the offset piston with its increased power capability can be used without at the same time having to subject the return chamber enclosing the driven pinion to any pressure other than return pressure. This greatly simplifies the sealing problem of the steering gear unit since a high pressure seal is needed only at the steering input shaft.

The means for directing the pressurized fluid to the sides of the enlarged section or disc and the operating end of the body includes a conventional screw valve within the body operated by said input shaft. A novel connecting passage extending along the length of said body and through a recess formed on said one side of the disc allows full travel of said piston. Further, the operating end of said body is cut back on the side opposite the return chamber whereby the size of the body is reduced for compactness while still allowing maintenance of the seal between the driving chambers and the return chamber.

The driven pinion of the steering gear of the present invention is provided with alternate sets of teeth and reduced lands. A detachable locking pin is provided so that the reserve set of teeth may be brought into engagement with the rack as needed. The lands have sufficiently reduced diameter to allow the passage of the adjacent sealing areas of the body of the piston without interference.

To gain substantial economy of manufacture of an offset piston, the body and enlarged section are made separately. The enlarged section which takes the form of a disc is detachably mounted on the end of the body.

Another feature of the present invention is the provision of a novel adjustable probe arrangement in the end caps of the cylinder to actuate relief valves in the piston and thereby limit travel thereof. The novel arrangement is provided by an O-ring encircling the probe which has sufficient cross-sectional thickness to adequately seal against the operating pressure of the adjacent driving chamber, and in addition to frictionally engage the probe in the end cap to hold the same in an adjusted position.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 1 is a longitudinal section taken through the steering gear of the present invention;

FIG. 2 is a partial longitudinal section of the steering gear of FIG. 1 taken along line 2–2 of FIG. 3;

FIG. 3 is a longitudinal section taken along line 3–3 of the steering gear shown in FIG. 1; and FIG. 4 is a transverse sectional view taken along line 4–4 of the steering gear in FIG. 1.

Referring in detail to the several FIGS. of the drawings, one of the principal features of the steering gear unit in accordance with the present invention is the use of an offcenter piston having a body 1 and an enlarged disclike section 2 slidably positioned within a stepped cylinder (see FIG. 1) without the need to subject the return chamber 19 to working pressure. This is accomplished by maintaining said chamber 19 separate from the driving chambers 9, 10 by sliding seal areas 5a, 6a immediately adjacent the return chamber 19 along the cylinder. Since the body 1 is reduced from that which it would normally have to be for a power output comparable to an output represented by the piston size of enlarged portion 2, it will be realized that several inches are saved between the distant corner of the cylinder at the cylinder head 3 and the center of output shaft 4. The stepped cylinder includes a first portion 5 slidably receiving the body 1 and a second portion 6 slidably receiving the enlarged disclike section 2 of the piston. These two portions 5, 6 of the cylinder provide corresponding driving chambers 9, 10 and 10a as can be seen by viewing FIG. 1.

A valve 7 is located within the body 1 and is adapted to be shifted in a conventional manner by a steering input shaft 33 provided with a threaded engagement 15. The shaft is rotatably journaled in the cylinder by a bearing 8, the races of which are locked to their corresponding parts by inner and outer nuts 34, 35. Upon rotation of the shaft 33 to displace the valve 7 axially toward the bearing 8, hydraulic fluid is directed into the cooperating driving chambers 9, 10 through a channel 11 (see FIG. 3) extending substantially the full length of the piston. So that the body portion 1 of the piston can move the full distance toward the end cap 3 without cutting off the flow to the chamber 10, a recess 12 is provided in the enlarged disclike section 2. The hydraulic fluid is provided to the channel 11 through a port 11a which in turn communicates with an annular groove 11b on the valve 7.

Remembering that the valve 7 has been shifted toward the bearing 8 or to the right, as viewed in FIG. 1, it can be seen that the fluid arrives at groove 11b via the port 51 with the hydraulic fluid flowing from the pump (not shown) through an entrance port, longitudinal groove, and passage 49. In this mode of operation, since the fluid pressure is thus acting against the face of the body 1 and the corresponding face of the enlarged section 2 defining the driving chambers 9, 10, respectively, the entire piston is moved in the desired direction to the right (FIG. 1) with the same force and as though said piston had the same diameter as section 2 throughout. The simultaneous pressurization of the driving chambers 9, 10 has been performed in concert to accomplish this result while at the same time maintaining the return chamber 19 free of operating pressure by the sealing area 5a, 6a (FIG. 1).

When turning of the vehicle in the opposite direction is required, the shaft 33 will be moved so as to cause the threaded engagement 15 to move the valve 7 in the opposite direction or to the left, as viewed in FIGS. 1 and 3. When this is done another annular groove 11c is exposed to the pressurizing bore 51 thereby causing fluid to pass through port 13 which extends through the enlarged section 2 and into the driving chamber 10a. With the chamber 10a thus pressurized, the hydraulic fluid operates against the full face to drive the piston back to the left, as viewed in these FIGS.

In order for no part of the effective area of the piston to be lost as a result of the shaft 33 extending through the chamber 10a, a duct 14 connects with the annular clearance around the threads 15 (see FIG. 3) and thus allows pressurized fluid to enter an interior chamber 17 adjacent the end of said shaft 33, thus allowing application of pressure against the body 1 at an end face 16. The duct 14 serves the additional purpose of allowing bleed of trapped air from the interior chamber 17 when the steering gear is initially filled with fluid during startup. This auxiliary function is particularly useful when the steering gear is to be installed in a vertical position thereby hindering removal of the air through other paths.

When the annular groove 11b is moved to pressurize the driving chambers 9, 10 through fluid entering at port 51, the annular groove 11c is now opened to the chamber 10a via port 13 whereupon the fluid is exhausted through the right port 50 (see FIG. 3), the passage 48, and the return chamber 19. On the other hand, when the valve 7 is shifted to pressurize the groove 11c and thus the driving chamber 10a, the annular groove 11b is connected to the port 11a and the chamber 9, 10, which in turn is thus exhausted through the left exhaust port 50, and the channel 48 to the return chamber 19. From the chamber 19 the fluid returns via pipes 20 to the reservoir and pump (not shown) for recirculation through the power steering system.

The compactness of the unit is further enhanced by the shape of the left-hand or operating end of the body 1, as shown at reference numeral 18 in FIG. 1. The piston is at this point cut back, that is, formed eccentrically, so that the end cap 3 may be correspondingly tapered to afford clearance with other parts of the vehicle, such as the schematically shown truck spring in FIG. 1. The portion of the body 1 adjacent the chamber 19 remains sufficiently extended to form what might be referred to as an eccentric boss to insure the formation of sealing area 5a. As indicated above, this sealing area serves to prevent communication between the driving chamber 9 and the return chamber 19 whereby fluid under working pressure is prevented from entering the latter.

The body 1 translates its longitudinal movement to a driven pinion 20, which in turn is fixed to the output shaft 4. This driving arrangement is provided between points 21 and 22 of said body 1 through a rack 23. Because of the necessity of maintaining the seal areas at 5a, 6a, the rack 23 may not be made to extend beyond the indicated points 21, 22 since to do so would allow communication of pressurized fluid to the return chamber 19. To solve this problem, there is provided a double set of teeth 26 between which are positioned lands of reduced diameter. Thus, upon movement of the piston and accordingly movement of the pinion 20, the points 21, 22 will be received within the lands between the teeth 26 and thereby avoid interference which would otherwise occur.

The provision of a reserve set of teeth 26 rather than merely a single gear sector affords a means of measuring the gear 20 over pins during the manufacturing operation. Also, two holes 27, 28 positioned 180° apart are provided so that the driving pin 29 may be inserted at two locations thus bringing either set of gears 26 into operating position opposite the rack 23. In order to provide for quick removal of the pin 29 for bringing the reserve set of teeth into engagement with the rack, a locking pin 41 is provided in a receiving aperture 42, which pin 41 can be removed upon detachment of one side of the steering gear unit. In other words, this provides two possible ways in which the gear 20 can be put on the output shaft 4 without disturbing the relationship between splines 30, 31 (see FIG. 4) thus allowing the output shaft to be marked for timing.

The enlarged section 2 of the piston carries a piston ring 31 in groove 36 to avoid the necessity of having to fit the parts perfectly. On the other hand, the piston body 1 is accurately machined to fit the cylinder bore 5 in extremely close relationship in order to prevent leakage of pressurized fluid into the return chamber 19; no piston rings thus being required at the sealing areas 5a, 6a.

For convenience in allowing the different machine operations to be performed separately on the body 1 and the enlarged portion 2, these two parts are made separate and connected together by any number of screws or the like (see FIG. 1). Also, in servicing it will be realized that should either the body 1 or the enlarged portion 2 of the piston be required to be replaced, such repair can be made with less expense.

A positioning pin 43 is provided for holding the valve 7 in the proper position during operation of the shaft 33. The pin 43 carries an O-ring 44 in groove 45, which effectively prevents communication and thus seals the internal chamber 17 from the driving chamber 10 when the piston is displaced toward bearing cap 47.

Adjustable threaded probes 52, 53 are provided in end cap 3 and bearing cap 47, respectively. The purpose of these probes is to operate adjacent ball relief valves as shown in FIG. 2, and as described in detail in my previous U.S. Pat. No. 3,092,083, entitled "Piston for Power Steering System," issued Jun. 4, 1963. It is of course necessary to seal the driving chambers 9, 10a leaking to ambient pressure, and secondly, to maintain the probes 52, 53 in an adjusted position once set. For this combined purpose, there is provided O-rings 54 and 55 which are adapted to fit within the corresponding bores 57, 56 around the probes 52, 53. The cross-sectional size of the O-ring is, in accordance with the present invention, sufficient to (1) seal the annular opening between the probes 52, 53 and the corresponding bores 57, 56, and (2) provide sufficient friction to maintain said screws 52, 53 in the adjusted position without further locking by conventional locknuts or the like.

With reference now back to FIG. 1, there is shown a dirt seal 58 in the bore 59 surrounding the shaft 33 which provides for the exclusion of dirt and water, such as to protect the high pressure seal 60 positioned within space 61 adjacent the bearing 8. Also protected is of course the intervening space 62 between the seals 58, 60 from the admission of dirt, water and other damaging matter.

The seal 60 is the only high pressure seal which is required in the entire steering gear unit. This is so since from the foregoing description, it will be understood that with the seal areas 5a, 6a on the body 1 of the piston, at no time is high pressure fluid allowed to get into the return chamber 19. This results in relieving seals 63, 64 for output shaft 4 from working under high pressure, as has heretofore been required. It will be noted that this basic improvement of achieving compactness and only the one high pressure seal 60, has been applied to the proven construction in which the operating valve 7 is positioned within the body 1 of the piston and the rack 23 is formed on the outer surface of said piston 1.

It is also in summary noted that the formation of the piston in a separate body and enlarged section 2 is less expensive and more practical than the integral construction of the prior art. The body 1 and the enlarged portion 2 are fastened together by any number of conventional bolts, which thereby make it practical to manufacture the parts separately and to later detach the parts for separate service, if desired. The feature of using the O-rings 57, 56 for (1) sealing and (2) locking the adjustment of the probes 52, 53 is also a considerable costwise advantage. Further compactness is realized by a cutback portion at 18 on the body 1 which is novel in the field of power steering gears and affords additional saving of space which is definitely of value in modern vehicles where space is at a premium.

In this disclosure, there is shown and described only the preferred embodiment of the invention, but, as aforementioned, it is to be understood that the invention is capable of various changes or modifications within the scope of the inventive concept as expressed herein.

I claim:

1. A fluid power steering apparatus comprising a stepped cylinder having a first enclosed bore and a second enclosed bore of enlarged size, an offset piston slidable within said cylinder including a body fitting said first bore and an enlarged section fitting within said second bore, a driving rack on said body, a driven pinion in engagement with said rack, a source of pressurized fluid, means for directing said fluid to and from first and second driving chambers only one at a time on opposite sides of said piston whereby said opposite sides are fully effective for driving said piston, and a return chamber for said fluid serving to enclose said driving chambers to maintain the same separate whereby said return chamber is subjected only to return pressure, said directing means includes a valve and connecting passage means for simultaneously directing said fluid to said third chamber on one side of said enlarged section and to said first chamber on the corresponding operating end of said body, said second chamber being positioned on the opposite side of said enlarged section.

2. The apparatus of claim 1 wherein said passage means extends substantially along the length of said piston and includes a recess formed in said one side of said section and a channel extending the full length of said body and communicating with said recess, whereby to allow full travel of said piston.

3. A fluid power steering apparatus comprising a stepped cylinder having a first enclosed bore and a second enclosed bore of enlarged size, an offset piston slidable within said cylinder including a body fitting said first bore and an enlarged section fitting within said second bore, a driving rack on said piston, said body and said first bore forming sealing areas at the ends of said rack, a driven pinion in engagement with said rack, a source of pressurized fluid, means for directing said fluid to and from first and second driving chambers only one at a time on opposite sides of said piston whereby said opposite sides are fully effective for driving said piston, said driven pinion having a first set of gear teeth engaging said rack, and a reserve set of gear teeth spaced from and independent of said first set, and means for repositioning said pinion to bring said reserved set into engagement with said rack, said first set and said reserved set being spaced from each other by a reduced land extending inside the depth of the teeth to prevent interference with the sealing area of said body at the ends of said rack, a third driving chamber around said body for cooperation in driving with said first driving chamber, and said directing means includes a valve and connecting passage means for simultaneously directing said fluid to said third chamber on one side of said enlarged section and to said first chamber on the corresponding operating end of said body, said second chamber being positioned on the opposite side of said enlarged section.

4. The combination of claim 3 wherein said first set of teeth, said reserved set of teeth and said separating lands between said teeth each occupy substantially one quadrant of said pinion.

5. In a power steering device for vehicles, the combination with a stepped cylinder, an offset piston slidable therein, said piston being formed of a body and an enlarged section, means for detachably securing said body and said enlarged section together, said enlarged section being of larger diameter than said body, a first driving chamber on one end of said body, a second driving chamber on one side of said enlarged section and a third driving chamber acting on the opposite side of said enlarged section and positioned around said body at the interconnection between said body and said enlarged section for acting in concert with said first driving chamber.

6. The combination of claim 5 wherein said body consists of an elongated body and said enlarged section consists of a disc mounted on one side of said body.

7. In a power steering device for vehicles, the combination with a cylinder and a piston slidable therein of a limit control valve in at least one end of said piston, an extensible probe mounted on said cylinder adjacent the limit of travel of said piston, said probe being adapted to operate said control valve, an O-ring extending around said probe, said O-ring having sufficient cross-sectional thickness between said probe and said cylinder without axial compression to prevent loss of fluid under pressure of said driving chamber and to frictionally retain said probe against rotation and thus maintain the same in a fixed adjusted position.

8. In a power steering device of claim 7 wherein said probe threadedly engages said cylinder, said O-ring being positioned away from said driving chamber by said threads.